(12) United States Patent
Hagio (10) Patent No.: US 6,282,198 B1
(45) Date of Patent: Aug. 28, 2001

(54) FREQUENCY BAND CONTROL DEVICE WITH CELL CONFLICT CONTROL

(75) Inventor: Masami Hagio, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/058,361

(22) Filed: Apr. 10, 1998

(30) Foreign Application Priority Data

May 21, 1997 (JP) ................................................. 9-130961

(51) Int. Cl.[7] ........................................................ C12N 5/00
(52) U.S. Cl. ................................................................. 370/395
(58) Field of Search ...................................... 370/395, 416, 370/414, 390, 396, 259, 242, 462, 271; 709/234, 250; 711/119; 340/826; 455/522, 137–139, 273; 379/142, 199, 201; 375/344, 317, 326

(56) References Cited

U.S. PATENT DOCUMENTS

| | | | |
|---|---|---|---|
| 4,564,838 | * | 1/1986 | Boulogne et al. .................... 370/462 |
| 5,083,269 | * | 1/1992 | Syobatake et al. ................... 370/395 |
| 5,130,975 | * | 7/1992 | Akata .................................. 370/416 |
| 5,687,324 | * | 11/1997 | Green et al. ........................ 370/414 |

FOREIGN PATENT DOCUMENTS 6-37785  2/1994  (JP).
7-66836  3/1995  (JP).

* cited by examiner

Primary Examiner—Wellington Chin
Assistant Examiner—Prenell Jones
(74) Attorney, Agent, or Firm—Rabin & Berdo, P.C.

(57) ABSTRACT

A frequency band control device for an ATM line in which a plurality of channels share a single frequency band on a frequency band division basis includes a plurality of input buffers each being assigned to a respective channel for storing respective cells input from the channel until receiving an acknowledge signal. A priority order giving circuit gives, in each of consecutive time slots, a particular priority order to the send request signals output from the input buffers storing the cells. A cell conflict controller selects, among the send request signals fed from the priority order giving circuit, the send request signal given the highest degree of priority, and then sends the acknowledge signal to the input buffer having output the above send request signal. When any idle frequency band exists in the circuit, the control device effectively assigns it to an ATM cell while guaranteeing the minimum frequency band required of the individual channel.

10 Claims, 10 Drawing Sheets

TRUTH TABLE (X = 0 OR 1)

| a | b | c | d | w | x | y | z |
|---|---|---|---|---|---|---|---|
| 1 | X | X | X | 1 | 0 | 0 | 0 |
| 0 | 1 | X | X | 0 | 1 | 0 | 0 |
| 0 | 0 | 1 | X | 0 | 0 | 1 | 0 |
| 0 | 0 | 0 | 1 | 0 | 0 | 0 | 1 |
| 0 | 0 | 0 | 0 | 0 | 0 | 0 | 0 |

Fig. 10

FREQUENCY BAND CONTROL DEVICE WITH CELL CONFLICT CONTROL

BACKGROUND OF THE INVENTION

1. Field of the Invention

The present invention relates to a frequency band control device and, more particularly, to a frequency band control device advantageously applicable to controlling a frequency band of a line constituting an ATM (Asynchronous Transfer Mode) network.

2. Description of the Background Art

Today, there is an increasing demand for a B-ISDN (Broadband Integrated Services Digital Network) capable of implementing high speed, high quality communication. Standardization of ATM technology which is the heart of the B-ISDN is progressing at high speed. The ATM technology divides data to be transmitted into segments of forty-eight bytes, adds five-bytes of control information or a five-byte header to each forty-eight bytes so as to form a cell having a fixed length of fifty-three bytes, and transfers such cells via a transmission path. Because the ATM technology is feasible for high speed switching using hardware, it is attracting increasing attention in the B-ISDN field, which is required to transfer a plurality of media information lying in different frequency bands at the same time.

When a single line is shared by a plurality of channels, the conventional ATM technology fixedly allocates a frequency band available with the line in accordance with the frequency band needed by the individual channel. For this kind of control, it is a common practice to use a table listing information for designating the channel to occupy the line on a time slot or cell time basis. The position of the table from which the information is to be read is sequentially shifted every cell time, so that the frequency band is allocated to the channels.

The above frequency band control device, however, has the following problem left unsolved. Assume that a buffer assigned to the channel designated by the table stores no cells to be sent to the circuit. Then, not only the above channel is wastefully designated, but also cells cannot be sent from the other channels on which cells to be sent exist, resulting in an unoccupied frequency band.

SUMMARY OF THE INVENTION

It is therefore an object of the present invention to provide a frequency band control device capable of sending data immediately, whenever an unoccupied frequency band occurs in a line, by using the unoccupied band, while guaranteeing the minimum frequency band for the individual channel to transfer respective data.

In accordance with the present invention, a frequency band control device for an ATM circuit in which a plurality of channels share a single frequency band on a frequency band division basis includes a plurality of input buffers each being assigned to a respective channel for storing respective cells input from the channel until receiving an acknowledge signal. A priority order giving circuit gives, in each of consecutive time slots, a particular priority order to the send request signals output from the input buffers storing the cells. A cell conflict controller selects, from among the send request signals fed from the priority order giving circuit, the send request signal given the highest degree of priority, and then sends the acknowledge signal to the input buffer that output the above send request signal. When any idle frequency band exists in the circuit, the control device effectively assigns it to an ATM cell while guaranteeing the minimum frequency band required of the individual channel.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
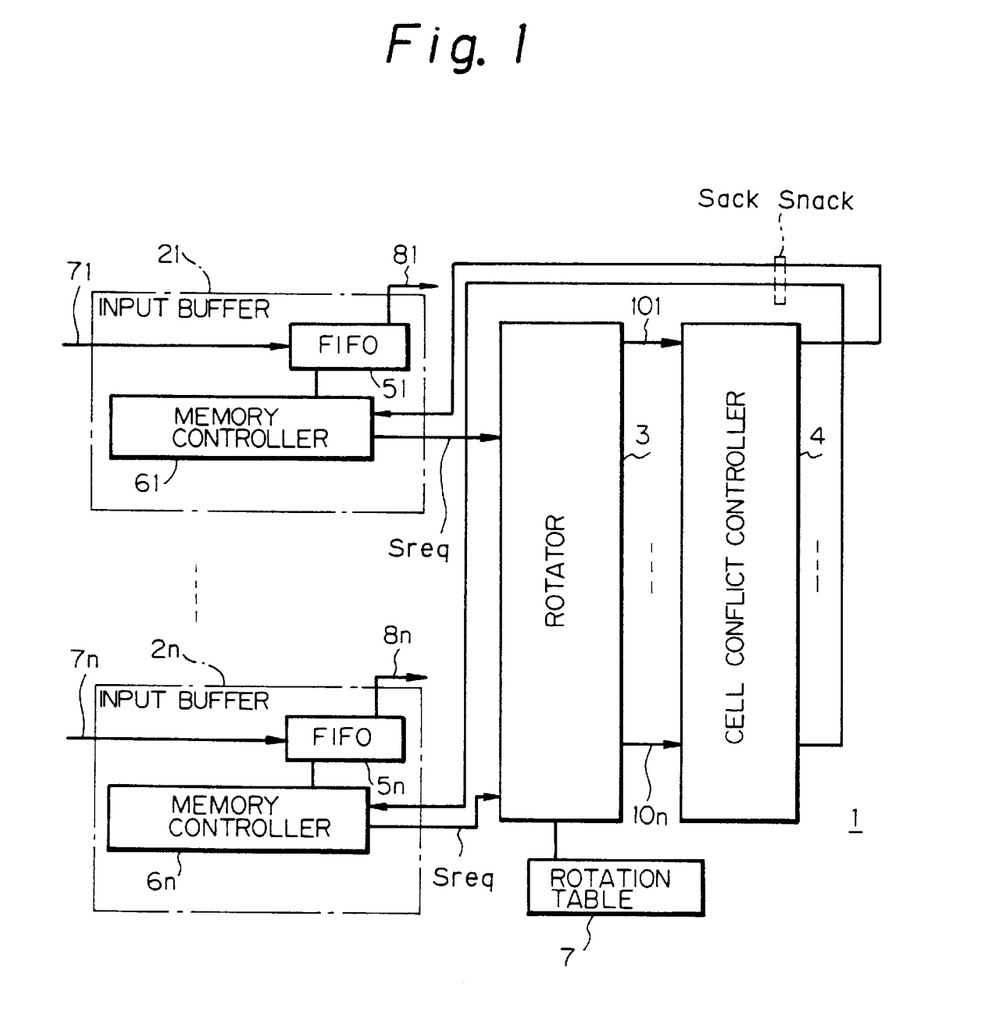
FIG. 1 is a block diagram schematically showing a frequency band control device embodying the present invention.

Referring to FIG. 1 of the drawings, a frequency band control device embodying the present invention is shown and applied to an ATM line by way of example. As shown, the control device, generally 1, is made up of a plurality of input buffers 21, 22, . . . , 2n each being assigned to a particular channel, a rotator 3, and a cell conflict controller or arbitrator 4. The control device 1 is characterized in that while basically assigning a frequency band to one channel at a time, it gives, when an ATM cell is not ready to be sent on the expected channel, the right to use the ATM line to another channel.

The input buffers or buffer means 2i (i=1, 2, . . . , n) are assigned to a particular channel to be controlled by the control device 1. The input buffers 2i respectively have FIFO (First-In First-Out) memories 5i (i=1, 2, . . . , n) and memory controllers 6i (i=1, 2, . . . , n). When the memory controller 6i belonging to any one of the input buffers 2i delivers a send command to the associated FIFO memory 5i, an ATM cell input through the buffer's input port 7i to the memory 5i first is sent to the ATM line.

Each memory controller 6i controls the associated FIFO memory 5i. Every time a new ATM cell is input to the FIFO memory 5i, the memory controller 6i increments a count for managing the number of ATM cells stored in the memory 5i by 1 (one). When one or more ATM cells exist in the FIFO memory 5i, the memory controller 6i delivers a send request signal Sreq to the rotator 3. On receiving an acknowledge signal Sack after the delivery of the send request signal Sreq from the cell arbitrator 4, the memory controller 6i feeds the previously mentioned send command to the FIFO memory 5i. At this instant, the memory controller 6i decrements the count managing the number of ATM cells by 1.

When the memory controller 6i determines that no ATM cells are stored in the FIFO memory 5i, it does not deliver a send request signal Sreq to the rotator 3. This successfully prevents the rotator 3 from giving a high degree of priority to the input buffer 2i storing no ATM cells; otherwise, an acknowledge signal Sack would be sent to such an unqualified input buffer 2i.

The ATM cells output from the input buffers 2i are input to the rotator 3 in parallel, as shown with associated connections 8i. The rotator 3 rearranges the cells on the basis of priority order information received from a rotation table 7. The rotator 3 performs the rearrangement once for a single time slot (single cell time). The rotation table 7 lists information (statuses hereinafter) showing how input signals should be rearranged and output, while arranging them such that the frequency band characteristic of the individual channel is satisfied.

Figure 2A:
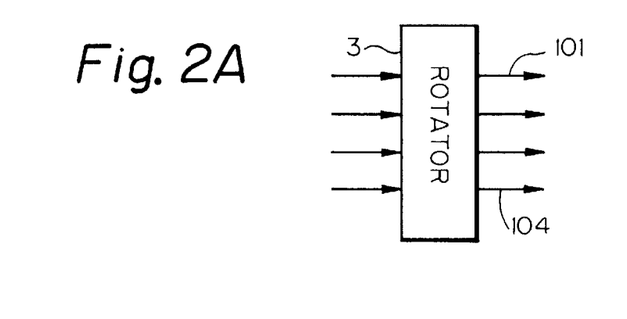
FIGS. 2A and 2B show inputs to and outputs from a rotator included in the illustrative embodiment and demonstrate consecutive statuses particular to the embodiment.
Figure 2B:
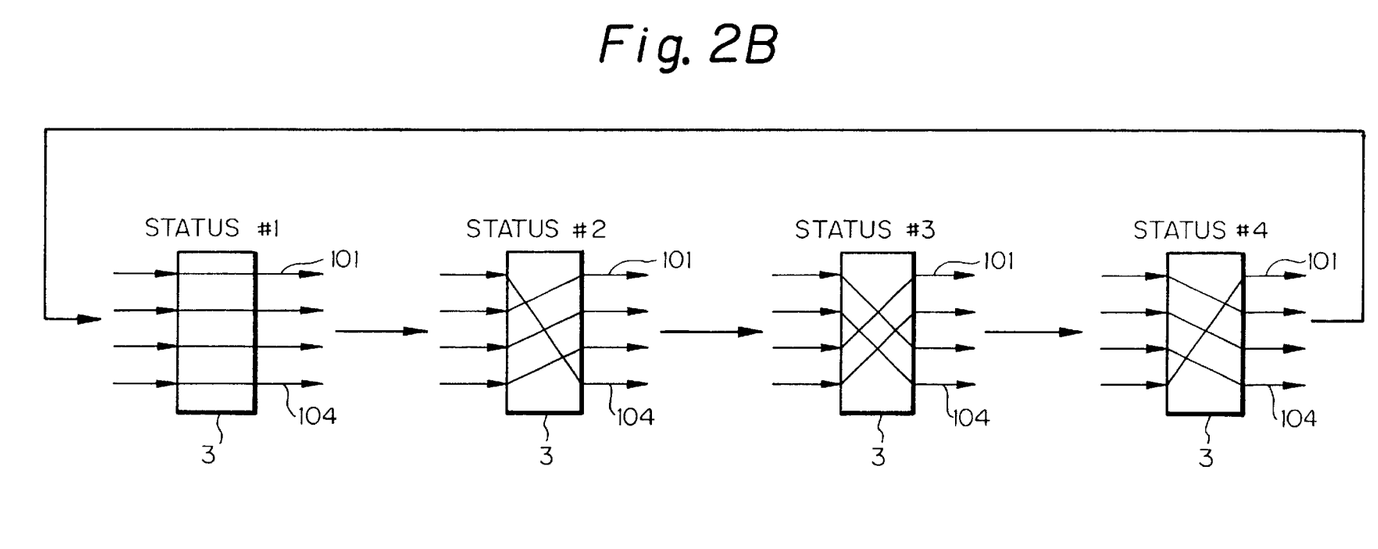

FIG. 2A shows four inputs to and four outputs from the rotator 3 by way of example while FIG. 2B shows specific statuses #1, #2, #3 and #4 listed in the rotation table 7. In FIG. 2B, the four channels are assumed to require the same frequency band, so that the four statuses #1–#4 are cyclically repeated. This guarantees impartial assignment of the frequency band to the channels included in the ATM line.

Assume that the control device 1 lacked the rotator 3. Then, a fixed priority order would be assigned to the plurality of channels and would make it difficult to maintain impartiality among the channels. For example, when any two of the channels of the ATM line output the send request signals Sreq at the same time, the cell conflict controller 4 would send the acknowledge signal Sack to only one of the channels at all times, causing the other channel to simply wait without sending any cell. With the rotator 3, the control device 1 is capable of sequentially feeding the acknowledge signals Sack to the channels and thereby preventing any one of them from simply waiting.

While the specific statuses shown in FIG. 2B are so set as to obviate impartiality among the channels, the statuses may be intentionally arranged such that a higher degree of priority is given to a particular one of the channels. With this alternative arrangement, it is possible to assign the frequency band more often to the particular channel than to the other channels.

Figure 3A:
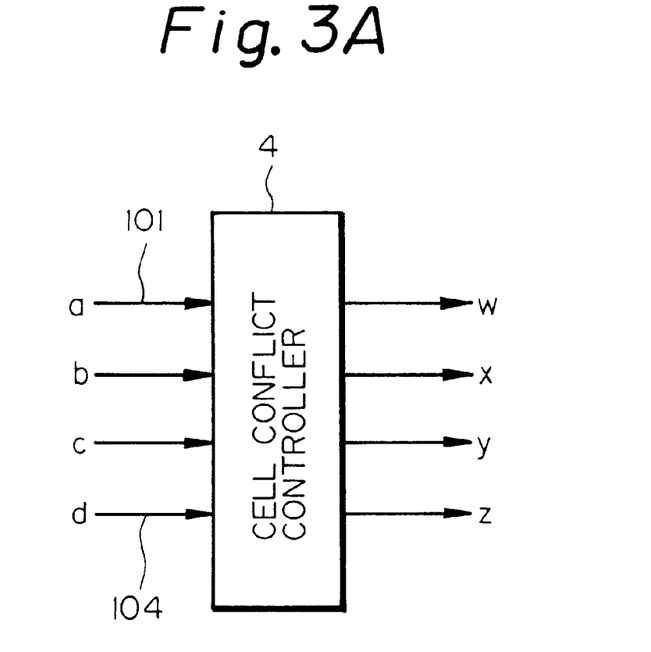
FIG. 3A shows inputs to and outputs from a cell conflict controller also included in the illustrative embodiment.
Figure 3B:
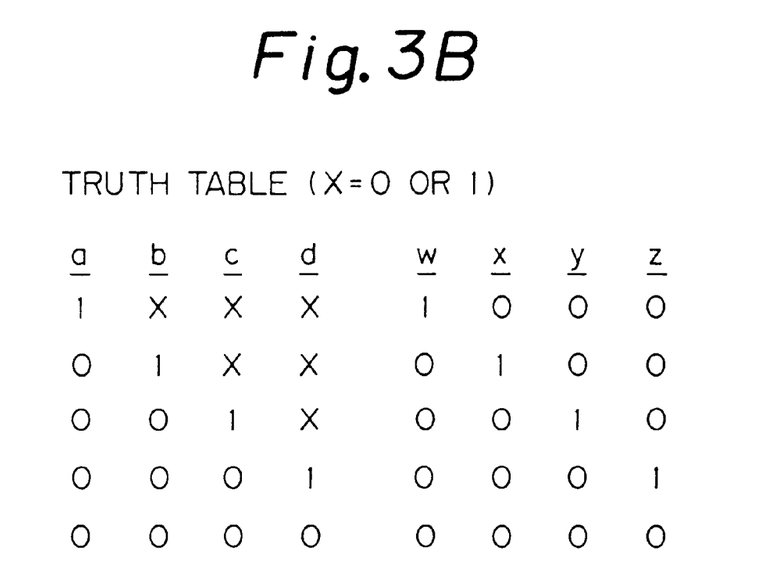
FIG. 3B shows a truth table to be used by the cell conflict controller shown in FIG. 3A.

Referring again to FIG. 1, the cell conflict controller or selecting means 4 has inputs 101-10n to which a particular priority order is assigned. The controller 4 selects one of the send request signals Sreq input from the rotator 3 having the highest degree of priority, and returns the acknowledge signal Sack to the memory controller 6i having output the request signal Sreq of highest degree of priority. Specifically, as shown in FIG. 3A, the controller 4 receives four inputs a, b, c and d and produces four outputs w, x, y and z. FIG. 3B shows a specific truth table in which priority is given in the order of the inputs a–d. In this specific condition, the controller 4 sequentially scans the inputs a–d in this order in order to see if the send request signal Sreq is present on any one of them. The controller 4 returns the acknowledge signal Sack to the memory controller 6i whose send request signal Sreq is found first. For the other memory controllers 6i, the controller 4 outputs a non-acknowledge signal Snack.

Figure 4:
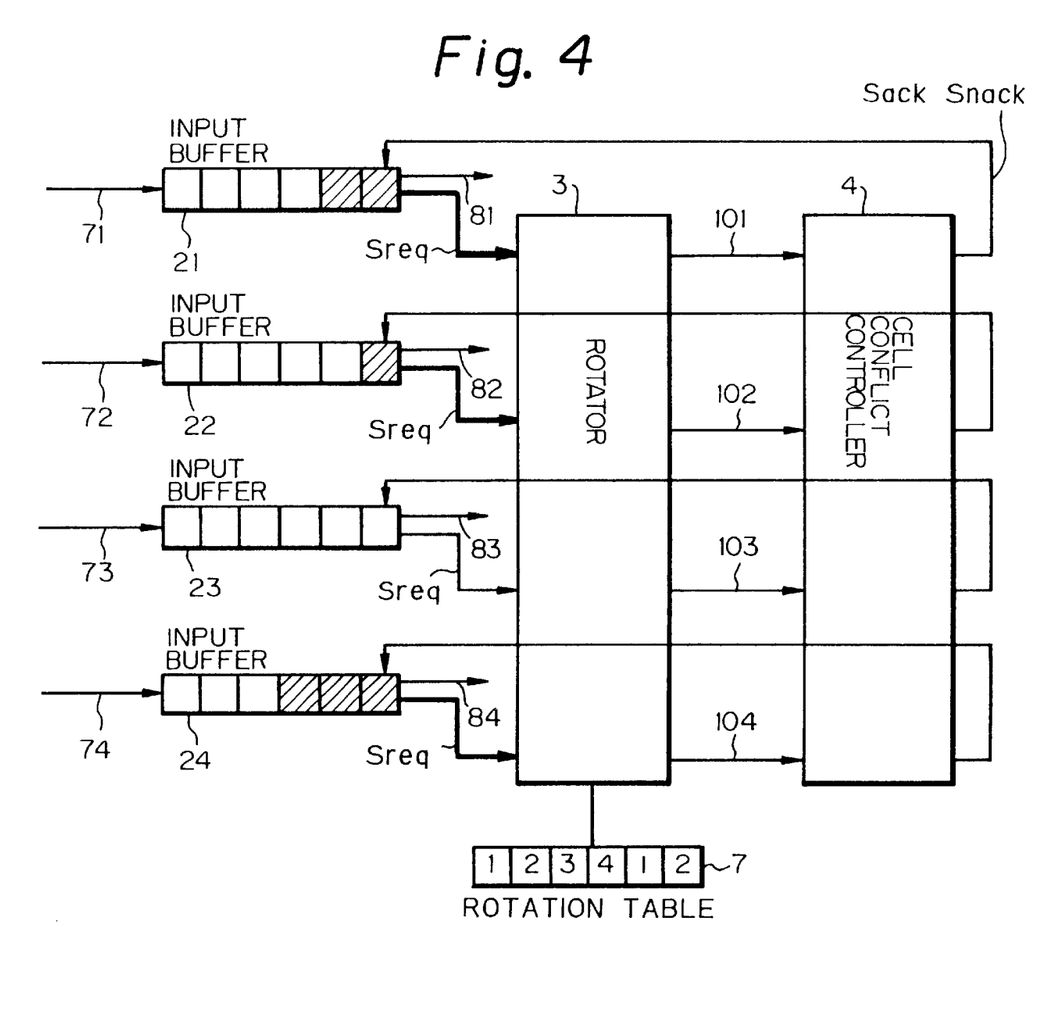
FIG. 4 is a block diagram schematically showing the initial condition of operation of the illustrative embodiment.

The operation of the control device 1 will be described with reference to FIGS. 4–10. Assume that the control device 1 manages four channels existing in the ATM line for the simplicity of description. First, as shown in FIG. 4, assume that the input buffers 21, 22, 23 and 24 store two, one, zero and three ATM cells, respectively, as indicated by hatching. As also shown in FIG. 4, assume that the rotation table 5 has a length of "6" and indicates that the statuses #1, #2, #3, #4, #1 and #2 should be sequentially selected in this order. FIGS. 5A–5D respectively show relations between the inputs and the outputs in the statuses #1–#4 which are identical with the relations shown in FIG. 2B.

Figure 5A:
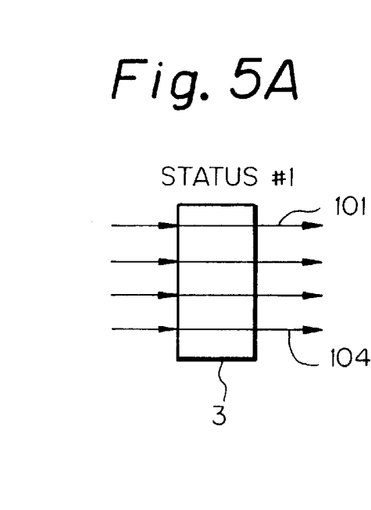
FIGS. 5A–5D each shows a particular relation between inputs and outputs designated by a respective status of the rotator.
Figure 5B:
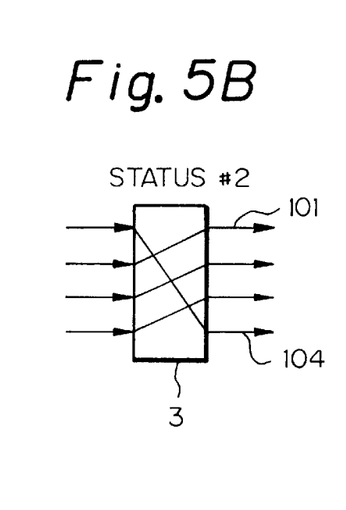
Figure 5C:
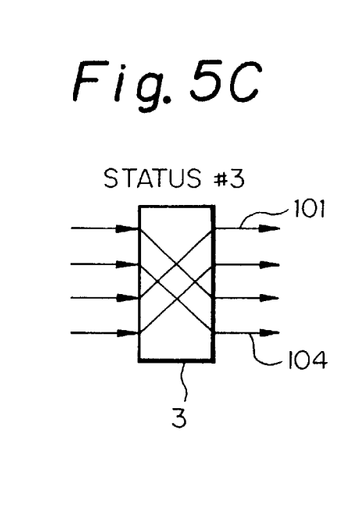
Figure 5D:
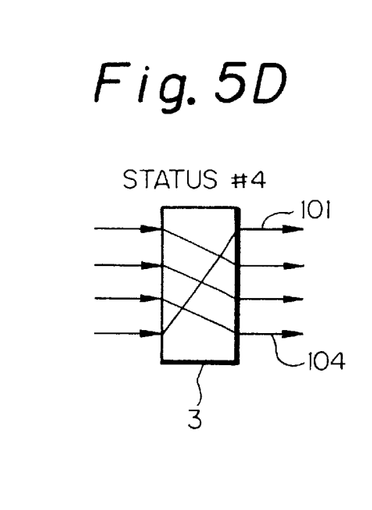

The status #1 shown in FIG. 5A shows that priority is given in the order of the input buffers 21, 22, 23 and 24. Likewise, the status #2 shown in FIG. 5B shows that priority is given in the order of the input buffers 22, 23, 24 and 21. Further, the status #3 shows that priority is given in the order of the input buffers 23, 24, 21 and 22. In addition, the status #4 shows that priority is given in the order of the input buffers 24, 21, 22 and 23.

When the input buffers 21–24 output the send request signals Sreq at the same time, the cell conflict controller 4 selects the input buffer 21 in the status #1, selects the input buffer 22 in the status #2, selects the input buffer 23 in the status #3, or selects the input buffer 24 in the status #4. As a result, each status occurs at a frequency corresponding to a guaranteed minimum frequency band value required of the channel of the individual input buffer 2i. In the specific condition shown in FIG. 4, one-third of the entire frequency band is assigned to each of the input buffers 21 and 22 while one-sixth of the entire frequency band is assigned to each of the input buffers 23 and 24.

Figure 6:
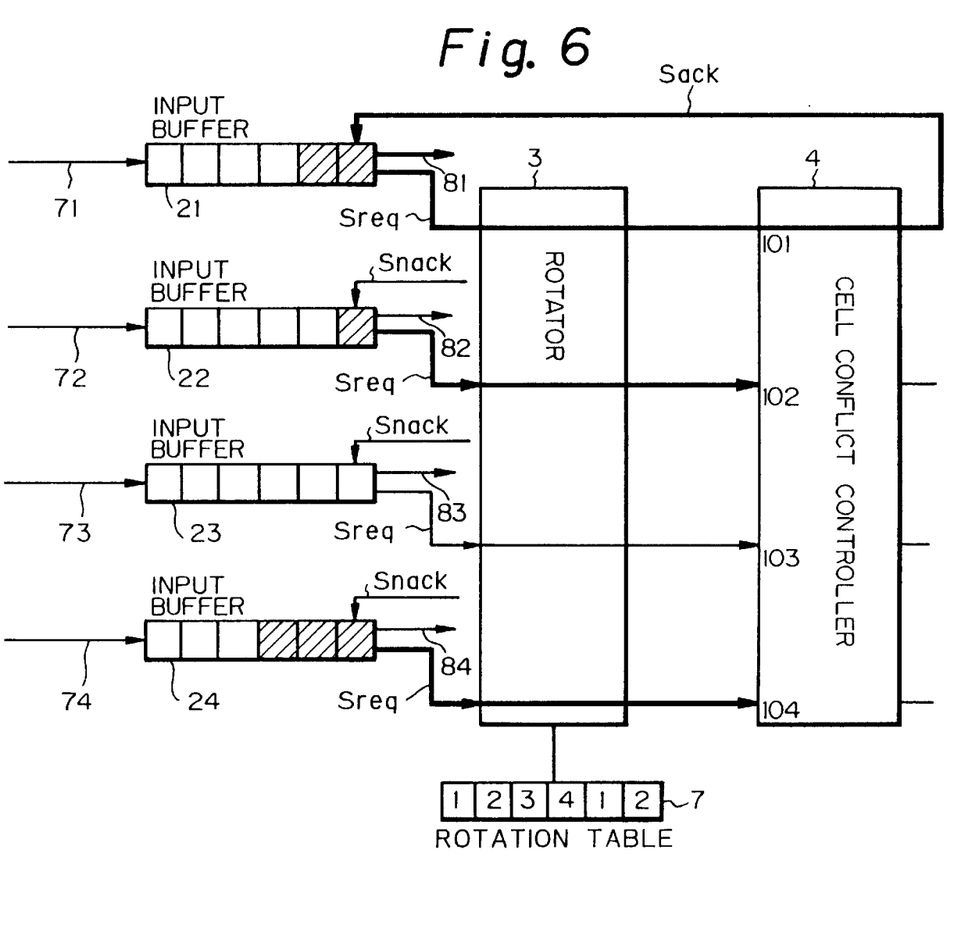
FIGS. 6–10 are block diagrams demonstrating the consecutive conditions of operation of the illustrative embodiment.

In the initial condition or first time slot shown in FIG. 4, the input buffers 21, 22 and 24 deliver the send request signals Sreq to the rotator 3 at the same time. In this case, the rotator table 7 indicates the status #1. Consequently, as shown in FIG. 6, the rotator 3 transfers the send request signals Sreq received from the input buffers 21, 22 and 24 to the input terminals 101, 102 and 104 of the cell conflict controller 4, respectively. In response, the controller 4 returns the acknowledge signal Sack to the input buffer 21 having priority over the other input buffers 22 and 24. On receiving the acknowledge signal Sack, the input buffer 21 sends the ATM cell stored in its FIFO memory 51 first to the ATM line. At the same time, the memory controller 61 included in the input buffer 21 decrements the count (number of stored cells) by 1, resulting in a count "1".

Figure 7:
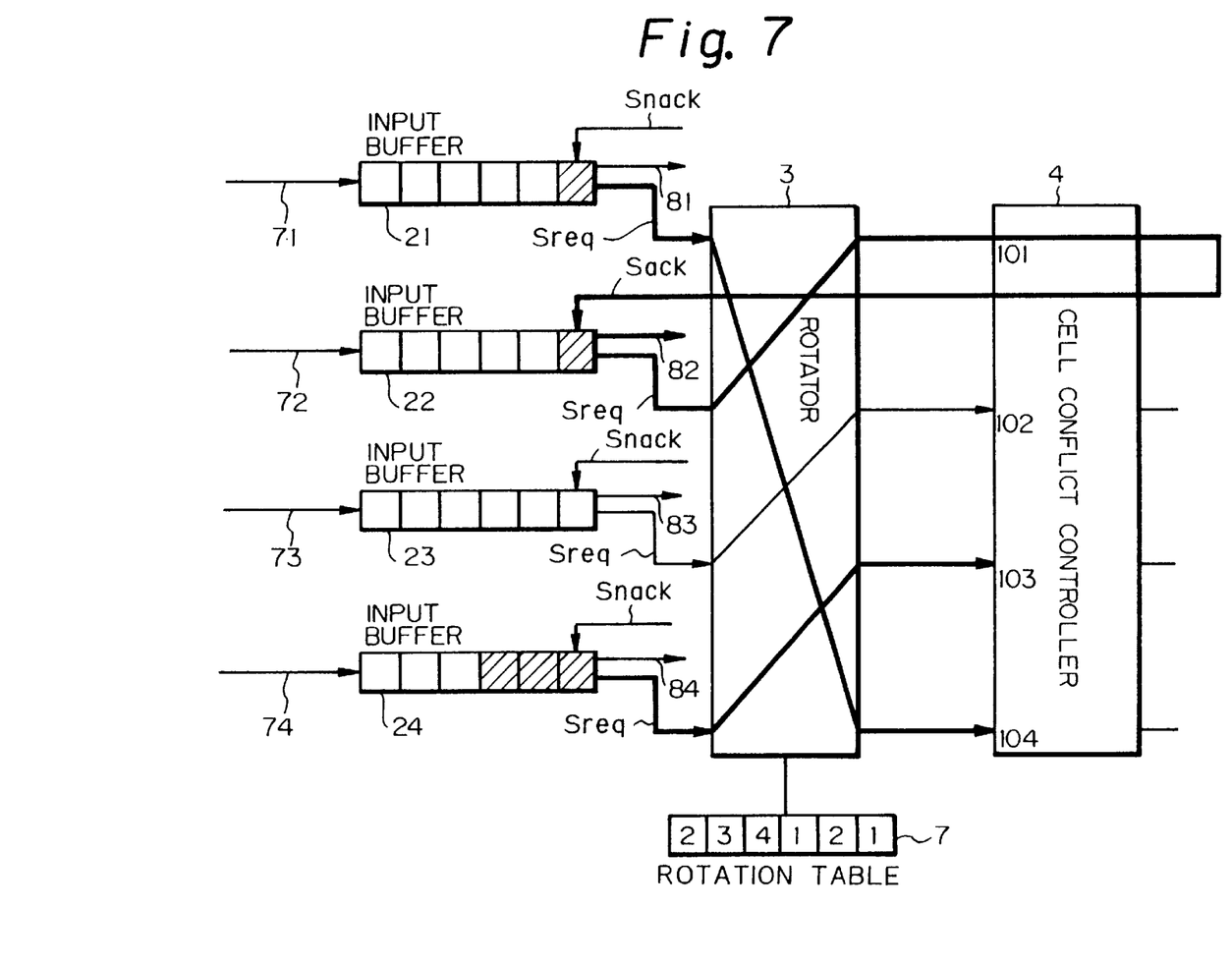

As shown in FIG. 7, in the second time slot, the rotation table 7 switches the status from the status #1 to the status #2. Because the input buffers 21, 22 and 24 still have ATM cells stored in their FIFO memories 51, 52 and 54, they deliver the send request signals Sreq to the rotator 3 at the same time. In the status #2, priority is given in the order of the input buffers 22, 24 and 21. Therefore, the cell conflict controller 4 returns the acknowledge signal Sack to the input buffer 22. In response, the input buffer 22 sends its ATM cell to the ATM line with the result that the number of ATM cells stored in the FIFO memory 52 is reduced to "0".

Figure 8:
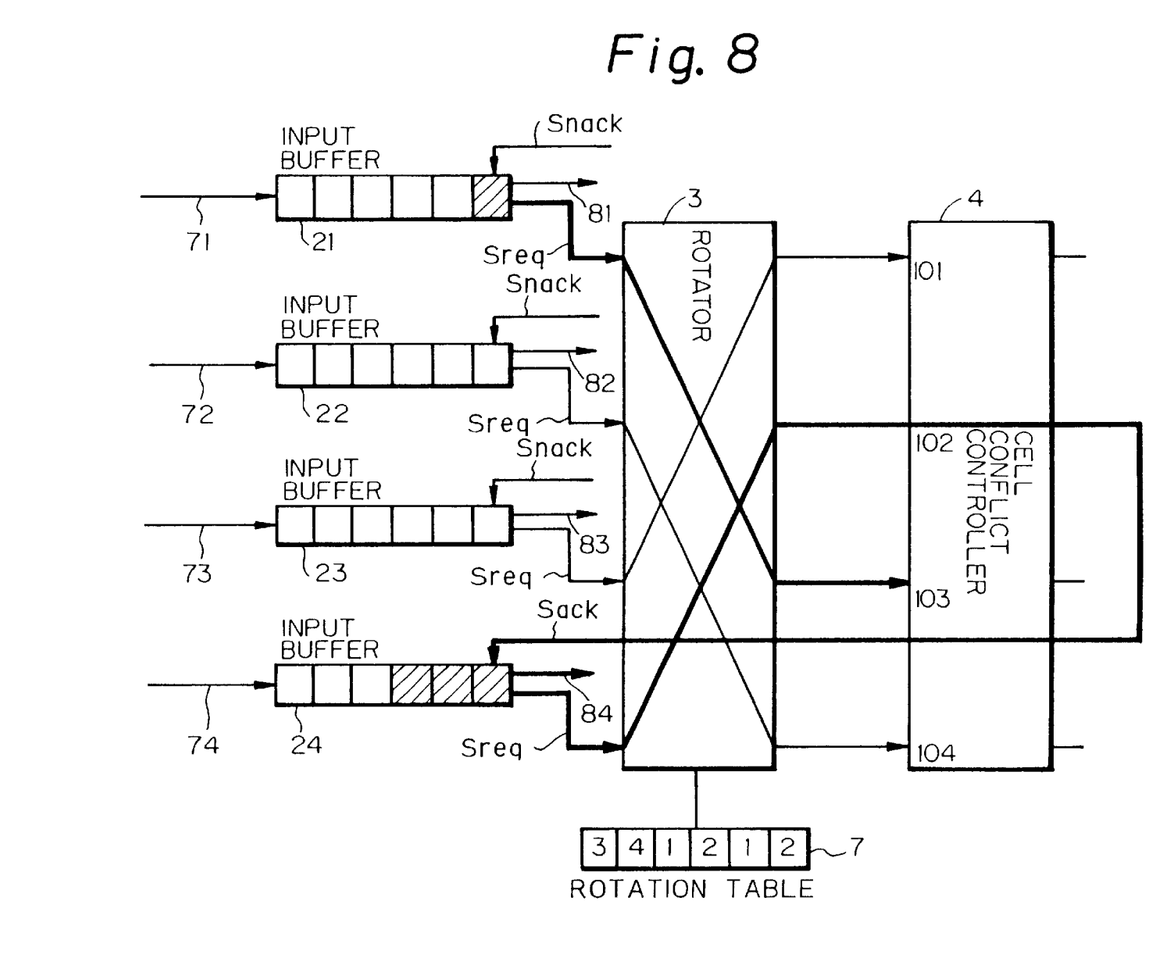

As shown in FIG. 8, in the third time slot, the rotation table 7 switches the status from the status #2 to the status #3. In this case, only the input buffers 21 and 24 output the send request signals Sreq. Although priority is given to the input buffer 23 in the status #3, the input buffer 23 storing no ATM cells does not output the send request signal Sreq. Therefore, the cell conflict controller 4 selects the send request signal Sreq output from the input buffer 24 given the second degree of priority and returns the acknowledge signal Sack to the buffer 24. In response, the input buffer 24 sends its ATM cell and reduces the number of ATM cells stored in the FIFO memory 54 to "2". In this manner, even in the condition in which a conventional frequency band control device would allow no ATM cells to be sent, the illustrative embodiment allows an ATM cell of a channel given a higher degree of priority to be sent.

Figure 9:
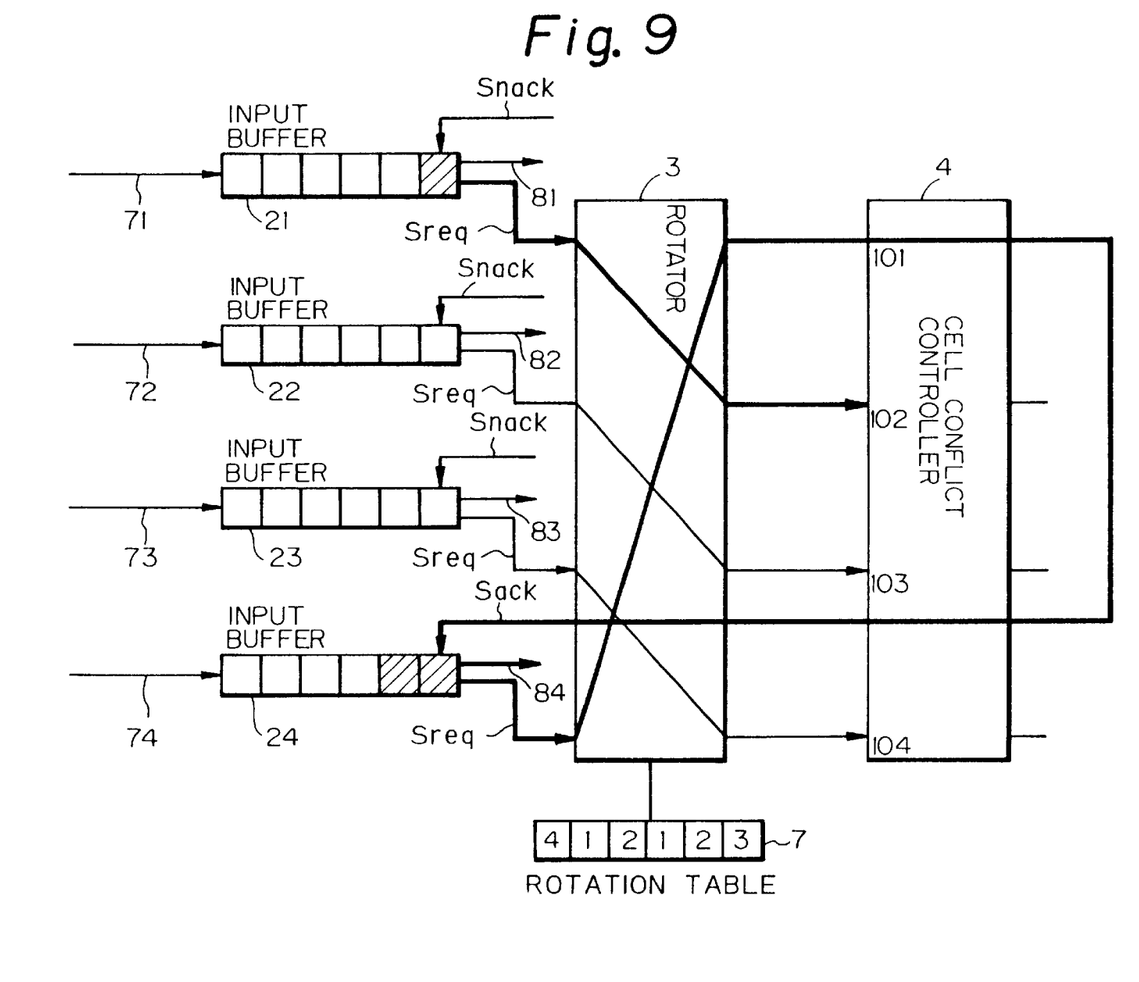
Figure 10:
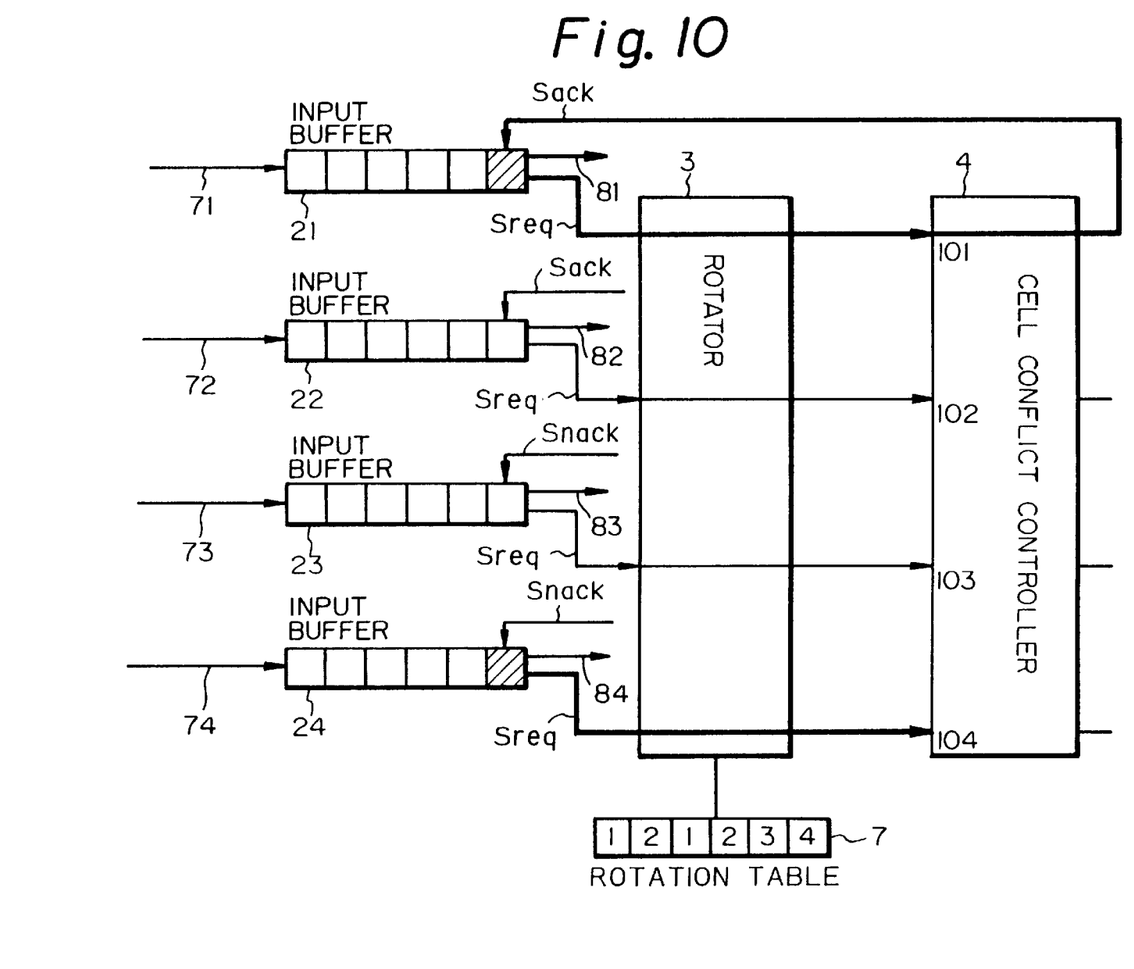

FIGS. 9 and 10 show conditions sequentially occurring after the condition shown in FIG. 8. In FIG. 9, the input buffer 24 given the highest degree of priority sends an ATM cell In FIG. 10, the input buffer 21 again given the highest degree of priority sends an ATM cell. Such a procedure is repeated in accordance with the priority order stored in the rotation table 7.

As stated above, when a certain input buffer does not store any ATM cell in a time slot assigned thereto, the illustrative embodiment gives another input buffer having the second degree of priority the right to send an ATM cell. If even the input buffer having the second degree of priority stores no ATM cells, the embodiment gives the above right to an input buffer having the third degree of priority. Therefore, when a plurality of input buffers store ATM cells therein, one of them having the highest degree of priority is allowed to send its ATM cell to an ATM circuit. It follows that when any one of the channels of the ATM circuit to which a given frequency band is assigned is unoccupied for a moment, the embodiment allows an ATM cell to be sent by effectively using the unoccupied channel.

Further, the rotator 3 and rotation table 7 included in the embodiment assign the right to send an ATM cell impartially to all the channels. ATM cells can therefore be sent evenly over all of the channels.

It is to be noted that impartiality refers to one among the channels to which the same frequency band is assigned. Also, the frequency band can be freely divided and allocated to the channels only if the rotation table 7 is rearranged. The division assigned to the individual channel is the minimum frequency band for transmission.

While the illustrative embodiment has been shown and described as dealing with four channels, the present invention is practicable with any ATM circuit having n (natural number) channels. Also, each FIFO memory 5i may be provided with any desired number of stages other than six stages shown and described. Likewise, the rotation table 7 may be provided with any desired length other than "6" in accordance with, e.g., the frequency band division ratio.

The FIFO memories 5i for storing ATM cells may be replaced with general-purpose memories used in the same manner as the FIFO memories or even with memory means of the type outputting ATM cells without regard to the order in which the cells are input.

In the illustrative embodiment, each memory controller 6i outputs the send request signal Sreq only when an ATM cell or cells are present in the FIFO memory 5i which it controls. Alternatively, all the memory controllers 6i may output the send request signals Sreq even when no ATM cells are stored in the associated FIFO memories 5i. In such a case, an arrangement will be made such that each memory controller 6i adds to the respective send request signal Sreq information showing whether or not an ATM cell is present, and the cell conflict controller 4 selects, among the signals Sreq indicative of the presence of an ATM cell, the signal Sreq given the highest degree of priority.

In summary, it will be seen that the present invention provides a frequency band control device capable of guaranteeing the minimum frequency band required of each channel and assigning, when any frequency band is unoccupied, the unoccupied frequency band to another channel.

The entire disclosure of Japanese patent application No. 130961/1997 filed on May 21, 1997 including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A frequency band control device for use in an ATM circuit, wherein a plurality of channels share a single frequency band on a frequency band division basis, comprising:
   a plurality of input buffers for storing cells, each buffer assigned to a different one of the plurality of channels for storing a cell from the channel to which the buffer is assigned, wherein during each of consecutive time slots, each buffer that stores at least one cell produces a respective corresponding send request signal,
   a priority order assigning circuit interconnected to said plurality of input buffers, said priority order assigning circuit, during each of the consecutive time slots,
      receiving the produced send request signals, and
      assigning a priority order to the received send request signals, the priority order being defined by an ordering of the buffers that produced the received send request signals; and
   a cell conflict controller interconnected to said order assigning circuit, said cell conflict controller, during each of the consecutive time slots,
      selecting the one of the send request signals highest in the priority order, and
      then sending an acknowledge signal to the buffer that produced the selected one send request signal;
   wherein, in response to receipt of the acknowledge signal, the buffer receiving the acknowledge signal sends out a cell stored therein, whereby the plurality of input buffers send out the cells which they store during the consecutive time slots in response to the acknowledge signals.

2. A device according to claim 1, wherein the priority order assigning circuit comprises
   a rotation table storing a priority order pattern defining priority orders different from each other as among said plurality of buffers; and
   a rotator that assigns the priority order from successive time slot to successive time slot, according to the pattern stored in the rotation table.

3. A frequency band control device for use in an ATM circuit, wherein a plurality of channels share a single frequency band on a frequency band division basis, comprising:
   a plurality of input buffers for storing cells, each buffer assigned to a different one of the channels for storing a cell from the channel to which the buffer is assigned, wherein during each of consecutive time slots each buffer that stores at least one cell produces a respective corresponding send request signal;
   a priority order assigning circuit interconnected to said plurality of input buffers, said priority order assigning circuit, during said each of the consecutive time slots,
      receiving the then produced send request signals, and
      assigning a priority order to the then received send request signals, the priority order being defined by an ordering of the buffers that produced the received send request signals; and
   a cell conflict controller interconnected to said priority order assigning circuit, said cell conflict controller, during said each of the consecutive time slots, selecting the one of the send request signals highest in the then assigned priority order, and sending an acknowledge signal to the buffer that produced the then selected send request signal;

wherein the buffer receiving the acknowledge signal responds thereto by sending out a cell stored therein, whereby the plurality of input buffers send out the cells which they store during the consecutive time slots in response to the acknowledge signals.

4. A device according to claim 3, wherein the priority order assigning circuit comprises a rotation table storing a priority order pattern defining priority orders different from each other as among said plurality of buffers; and a rotator that assigns the priority order from successive time slot to successive time slot, according to the pattern stored in the rotation table.

5. A frequency band control device for use in an ATM circuit, wherein a plurality of channels share a single frequency band on a frequency band division basis, comprising:

a plurality of input buffers for storing cells, each buffer assigned to a different one of the channels for storing a cell from the channel to which the buffer is assigned, wherein during each of consecutive time slots each buffer that stores at least one cell produces a respective corresponding send request signal;

a priority order assigning circuit interconnected to said plurality of input buffers, said priority order assigning circuit, during said each of the consecutive time slots, receiving the then produced send request signals, and assigning a priority order to the then received send request signals, the priority order being defined by an ordering of the buffers that produced the respective send request signals; and a cell conflict controller interconnected to said priority order assigning circuit, said cell conflict controller, during said each of the consecutive time slots, selecting the one of the send request signals highest in the then assigned priority order, and sending an acknowledge signal to the buffer that produced the then selected send request signal;

wherein the buffer receiving the acknowledge signal responds thereto by sending out a cell stored therein, whereby the plurality of input buffers send out the cells which they store during the consecutive time slots in response to the acknowledge signals.

6. A device according to claim 5, wherein the priority order assigning circuit determines the priority order to be assigned, as among the send request signals prioritized, independently of which buffers produce send request signals during the respective time slots.

7. A device according to claim 5, wherein the priority order assigning circuit comprises a rotation table storing a priority order pattern defining priority orders different from each other as among said plurality of buffers; and a rotator that assigns the priority order from successive time slot to successive time slot, according to the pattern stored in the rotation table, wherein the rotator determines the priority order to be assigned, as among the send request signals prioritized, independently of which buffers produce send request signals during the respective time slots.

8. A frequency band control device for use in an ATM circuit, wherein a plurality of channels share a single frequency band on a frequency band division basis, comprising:

a plurality of input buffers for storing cells, each buffer assigned to a different one of the channels for storing a cell from the channel to which the buffer is assigned, wherein during each of consecutive time slots each buffer that stores at least one cell produces a respective corresponding send request signal;

a priority order assigning circuit interconnected to said plurality of input buffers, said priority order assigning circuit, during said each of the consecutive time slots, receiving the then produced send request signals, and assigning a priority order to the plurality of buffers; and a cell conflict controller interconnected to said priority order assigning circuit, said cell conflict controller, during said each of the consecutive time slots, selecting from among the buffers that then produced send request signals the buffer highest in the then assigned priority order, and sending an acknowledge signal to the selected buffer;

wherein the selected buffer responds to receipt the acknowledge signal by sending out a cell stored therein, whereby the plurality of input buffers send out the cells which they store during the consecutive time slots in response to the acknowledge signals.

9. A device according to claim 8, wherein the priority order assigning circuit assigns the priority order independently of which buffers produce the send request signals.

10. A device according to claim 8, wherein the priority order assigning circuit comprises a rotation table storing a priority order pattern defining priority orders different from each other as among said plurality of buffers; and a rotator that assigns the priority order from successive time slot to successive time slot, independently of the which buffers produce send request signals during the respective time slots, according to the pattern stored in the rotation table.

\* \* \* \* \*